UNITED STATES PATENT OFFICE.

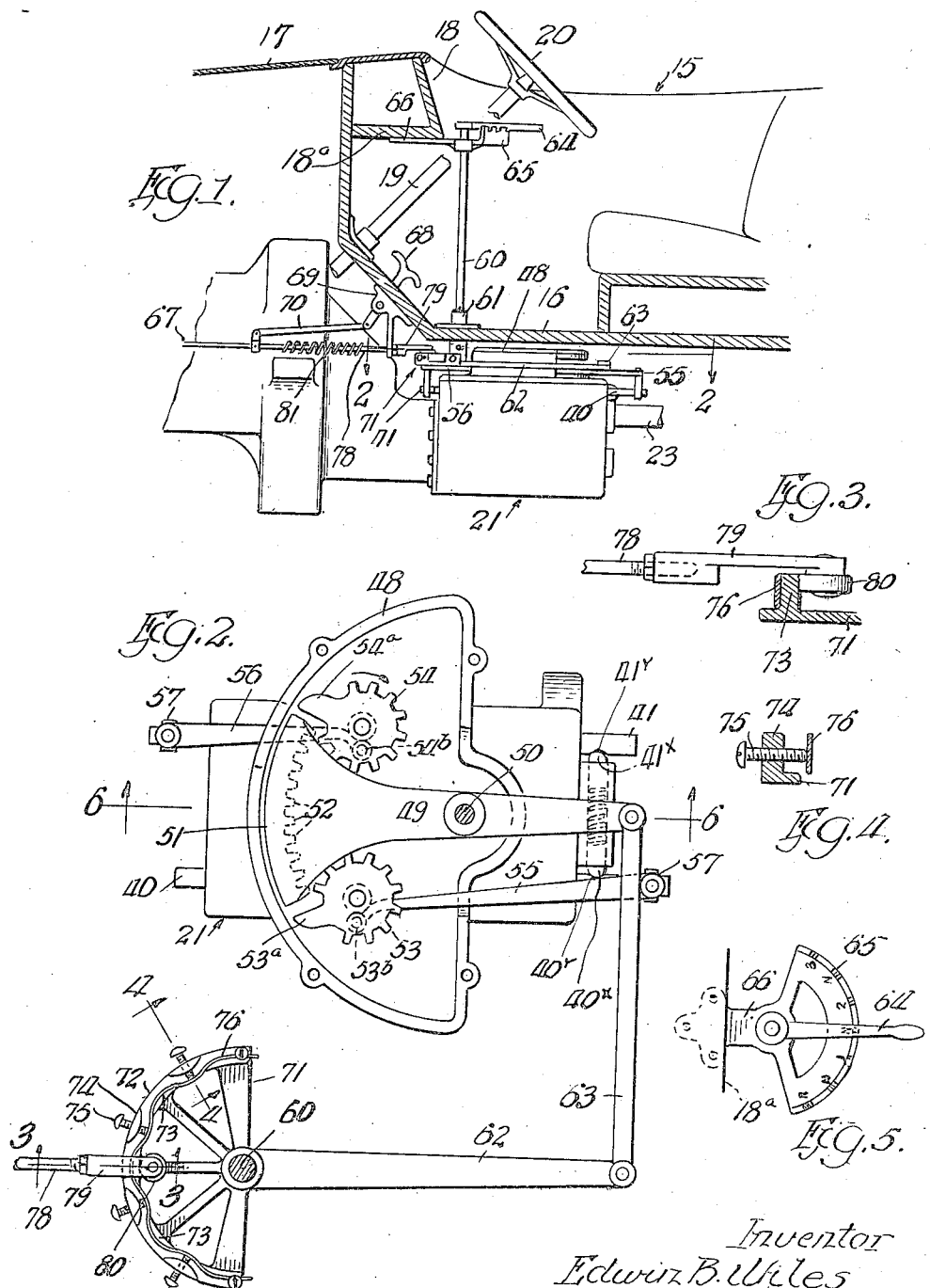

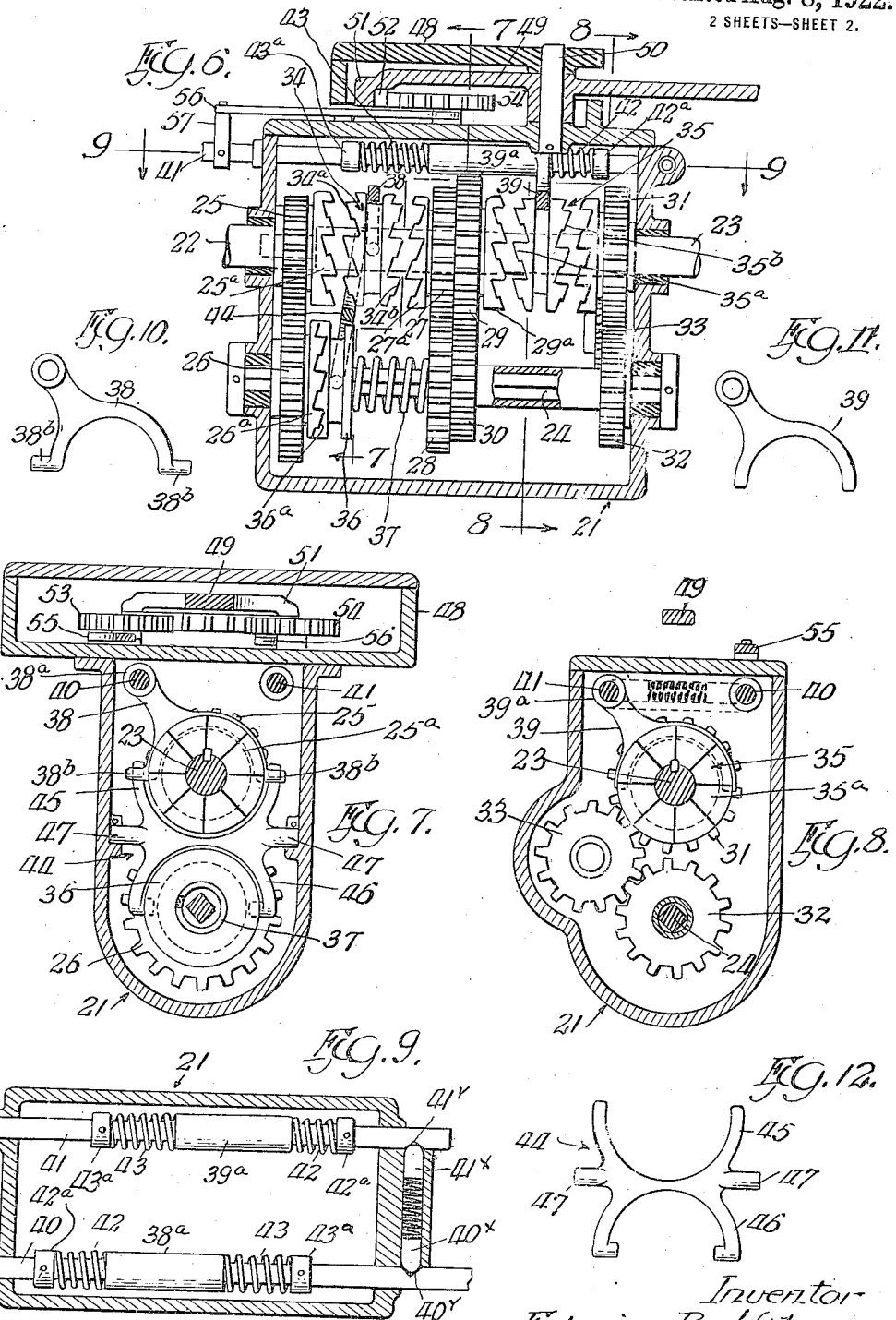

EDWIN B. WILES, OF CHICAGO, ILLINOIS.

GEAR-SHIFT MECHANISM.

1,424,790.　　　　Specification of Letters Patent.　　Patented Aug. 8, 1922.

Application filed November 8, 1920. Serial No. 422,455.

*To all whom it may concern:*

Be it known that I, EDWIN B. WILES, a citizen of the United States, and a resident of Chicago, in the county of Cook and State of Illinois, have invented certain new and useful Improvements in Gear-Shift Mechanism; and I do hereby declare that the following is a full, clear, and exact description thereof, reference being had to the accompanying drawings, and to the letters of reference marked thereon, which form a part of this specification.

This invention relates to certain novel improvements in gear shift mechanism and consists of the matters hereinafter described and more particularly pointed out in the appended claims.

My new gear shift mechanism is of the same general type as that disclosed in Letters Patent No. 1,241,803, granted to me on October 2, 1917, but comprises not only features by which a gearing of that type is simplified and improved, but also other features which are broadly new and which are of great advantage in the operation of the mechanism, as will more particularly be pointed out as I proceed with my specification.

In illustrating my improved gear shift mechanism, I have shown it as applied to the transmission gearing of a motor driven vehicle, but it will be manifest that it is capable of other application wherein its superior features may be advantageously used, and it is therefore not to be understood to be limited to such transmission gearing.

In the drawings:—

Figure 1 is a view representing a partial longitudinal section through the front end of an automobile showing my improved gear shift applied to the transmission gearing intermediate the motor shaft and the driven shaft.

Figure 2 is a view on an enlarged scale representing a plan of the gear shift mechanism in a plane indicated by the line 2—2 of Figure 1.

Figure 3 is a detail sectional view of Figure 2 in a plane indicated by the line 3—3 of Figure 2.

Figure 4 is a like sectional view of Figure 2 on a plane indicated by the line 4—4 thereof.

Figure 5 is a top plan view of the arm and sector by means of which the gear shift is operated.

Figure 6 is a vertical longitudinal section through the gear shift mechanism in a plane indicated by the line 6—6 of Figure 2.

Figure 7 is a transverse vertical section through Figure 6 in a plane indicated by the line 7—7 of Figure 6.

Figure 8 is a similar section in a plane indicated by the line 8—8 of Figure 6.

Figure 9 is a horizontal section through Figure 6 in a plane indicated by the line 9—9 thereof.

Figures 10 and 11 are detail elevations of certain yokes used in the gear shift that will be more particularly described later.

Figure 12 is a side elevation of a duplex shifting member which will likewise be more particularly described later.

Referring now to that embodiment of the invention illustrated in the drawings:—15 indicates the body of a motor vehicle, 16 the floor thereof, 17 the hood, 18 the dash, and 19—20 the usual steering post and steering wheel.

21 indicates the transmission gearing box which is located below the floor 15 in the usual manner. 22 indicates the motor shaft (see Figure 6), 23 the driven shaft (which drives the familiar differential gearing) and 24, the counter shaft. These shafts have bearing in, and are mounted in, the transmission gear box 21. On the motor shaft is the usual gear 25 which engages a larger gear 26 on the counter shaft 24. The last named gear 26 in this case, however, is loose on the counter shaft.

27—28 and 29—30 represent intermeshing pairs of gears,—one of each pair being loose on the driven shaft 23, and the other being fixed on the counter shaft 24. Said pairs of gears provide the necessary ratios for the speeds commonly known as first and second speeds in the operation of a motor vehicle, speeds in the operation of a motor vehicle, the gears 27—28, when operated, providing the second speed, and the gears 29—30 providing the first speed. 31 and 32 indicate gears respectively mounted on the driven shaft and the counter shaft, the gear 31 being loose on the driven shaft, and the gear 32 being fixed on the counter shaft. Said gears, with an intermediate gear 33, provide the reverse gearing for the driven shaft.

Each of the gears 25, 27, 29 and 31, have fixed to them associated clutch teeth indicated respectively by the numerals $25^a$, $27^a$, $29^a$, and $31^a$. The clutch teeth $25^a$ and $27^a$ face towards each other, and between them a clutch member 34, is feathered on the driven shaft, said clutch member having teeth $34^a$ adapted to engage the teeth $25^a$ on the gear 25, and having teeth $34^b$ adapted to engage the teeth $27^a$ on the gear 27. Similarly, there is provided between the gears 29 and 31 a clutch member 35 feathered on the shaft 23, and provided respectively with oppositely facing clutch teeth $35^a$—$35^b$ adapted for engagement with the clutch teeth $29^a$—$31^a$.

The gear 25 being fixed to the motor shaft, is always rotating when the motor shaft is running, as is also the gear 26 on the counter shaft which meshes with the gear 25. The gear 26 has clutch teeth $26^a$ which are adapted to be engaged by opposing clutch teeth $36^a$ on a clutch member 36, which is non-rotatively connected to, but slidable on the counter shaft 24. Said clutch member is normally held with its clutch teeth in engagement with the clutch teeth on the gear 26 by means of a coiled spring 37, which thus locks the gear 26 to said counter shaft.

A yoke 38 (see Figures 6 and 10) operatively engages the clutch member 34, and a similar yoke 39 (see Figures 6 and 11) operatively engages the clutch member 35. Said yokes have integrally formed bearing sleeves $38^a$—$39^a$ respectively, which are slidably mounted on parallel spaced rods 40—41, extending parallel to the motor shaft and driven shafts, and mounted so as to slide longitudinally at the top of the gear shift casing, as clearly seen in Figures 6 to 9 inclusive. The sleeves $38^a$ and $39^a$ are held in substantially fixed, but at the same time somewhat yielding position, on their respective rods by means of springs 42—43, which abut at one end against the ends of the associated sleeve, and at their other ends against collars $42^a$—$43^a$ fixed on said rods. The construction is such that when either of the rods 41—40 is moved longitudinally in the manner presently to be described, said movement will be communicated to the yoke mounted on that rod, but the springs will permit the yoke to yield somewhat in the movement of the rods.

44 indicates a duplex gear shift member (see Figures 6, 7 and 12) which consists of upwardly and downwardly facing yokes 45—46 respectively,—the first yoke being engaged by lateral projections $38^b$ on the yoke 38, and the second having operative engagement with the clutch member 36. Said duplex yoke has laterally extending pins 47 intermediate its ends which have rocking bearing, provided in any convenient manner, in the side walls of the gear shift casing as clearly shown in Figure 7. The arrangement is such that when the yoke 38 is shifted (to the left, as illustrated in Figure 6) the pins $38^b$ on said yoke, by their engagement with the top yoke 45 of the duplex member 44, rock said member on its axial pins 47 so that the bottom yoke 46 will shift the clutch member 36, against the action of the coil spring 37, so as to withdraw the teeth of said clutch member from engagement with the clutch teeth of the gear 26, thereby disconnecting the gear 26 from the counter shaft, which will then remain idle although the gear 26 continues to rotate.

The reciprocable yoke carrying rods 40—41 are operated by the following mechanism:—In a semi-cylindrical casing 48, located above the transmission gear casing, is mounted a horizontal, oscillatable arm 49. Said arm is pivotally mounted on an upright stud or pin 50. The arm 49 has an arcuate flange 51, provided with internal gear teeth 52. Arranged at either side of the arm 49, and mounted on suitable studs in the bottom wall of the casing, are mutilated gears 53—54, which are adapted to be engaged by the internal teeth 52 of the arm 49. Said gears have radial shoulders $53^a$, $54^a$, which are adapted to be engaged by the ends of the flange 51, which engagement imparts an initial rotative movement to the gear 53 or 54. The gear 53 has a crank pin $53^b$, which is connected by a link 55 to the rod 40, and the gear 54 is similarly connected by a crank pin $54^b$ and pitmen 56, to the rod 41, said pitmen being extended in opposite directions, the one 41, towards the front of the vehicle or to the left, as seen in Figure 2, and the other, towards the rear or to the right, as seen in that figure. Each pitman is connected to its associated rod by means of a suitable swivel joint 57 which permits the necessary swing of the pitman. The rods 40, 41, are yieldingly locked, when their respective yokes are in neutral position, by means of spring controlled pins $41^x$, $40^x$ (see Figure 9) which are mounted in a suitable box in the end wall of the casing 21, and which are adapted to engage in notches $41^y$, $40^y$.

The operation of the mechanism thus far described is as follows:—When the arm 49 is swung to the right (see Figure 2), the flange 51 will strike the radial shoulder $54^a$ on the gear 54, and in its further movement, by engagement of its teeth 52 with said gear, will rotate the gear in the direction indicated by the arrow in Figure 2. This rotation through the pitman 56 will impart a forward movement to the rod 41, and likewise to the yoke 39, which will move the clutch member 35 into operative engagement with the clutch teeth on the gear 29. As the gear 26 is normally connected to the counter shaft by the clutch 36, and the first and second speed gears are thus normally being operated, the engagement of the clutch member 35 with the clutch teeth on the gear 29 will put the driven shaft into first speed.

If the arm 49 be now swung to the left, the rod 41 will be moved back to its first position, and the clutch member 35 will be brought to neutral position. A further swinging movement of the arm 49 towards the left will operate to rotate the gear 53 towards the left so as to move the pitman 55, and with it, the yoke rod 57, to the rear, thereby moving the clutch member 34 into operative engagement with the clutch teeth on the gear 27. This puts the driven shaft in second speed. A further movement of the arm 49 towards the left will operate to move the pitman 55 forwardly, and with it, the yoke rod 40, in the first instance withdrawing the clutch member 34 from its engagement with the clutch teeth on the gear 27, thus passing through neutral position, and then coming to engagement with the clutch teeth on the gear 25, thereby directly coupling the motor shaft to the driven shaft, or putting said driven shaft in third speed.

In the last movement of the yoke 38, in moving the clutch member 34 into engagement with the clutch teeth on the gear 25, the pins 38$^b$ on the yoke 38 engage the top yoke 45, of the duplex member 44, and rock the same forwardly, thus rocking the bottom fork 46 rearwardly so as to withdraw the clutch teeth 36 from engagement with the gear 26, thereby disconnecting said gear 26 from the counter shaft 24. The rotation of said gear will thus be inoperative to drive the counter shaft and the gears 27, 28, 29, and 30, and 31, 33, 32, which will then remain idle, as long as the driven shaft is operated at third speed. The reverse movement of the arm 49 towards the right will move the pitman 55, and the yoke rod 40 first rearwardly and then forwardly to its first position, this movement taking the yoke 38 through the neutral point, then to the point where it couples the clutch member 34 to the gearing for the second speed, and then forwardly again to neutral position, when all the parts will have been restored to their normal neutral position. At the same time, as the yoke member 38 moves rearwardly to neutral position, the spring 37 will move the clutch member 36 again into engagement with the clutch teeth on the gear 26, restoring the operative connection of the gear 25 to drive the counter shaft and the other gears in the casing.

If it is desired to go into reverse, the arm 49 is shifted to the right so as to rotate the gear 54 beyond the position first described for bringing the gearing to first speed, whereupon in the rearward movement of the rod 41, the clutch member 35 will be moved into engagement with the teeth on the gear 31, thus coupling the driven shaft to the reverse gearing.

It will be manifest from the foregoing that in the operation of the arm 49 first to the right to give a quarter turn to the gear 54, and then to the left, restoring said gear 54 to first position and imparting a three-quarter turn to the gear 53, the gear shift is carried through the three speeds in succession with a neutral point between each speed. The movement of the arm 49 to the right again brings the several speeds into operation in reverse order, and a further movement of the arm 49 beyond its position where the first speed is given, brings the reverse gearing into play.

The arm 49 is extended through suitable slots in the walls of the casing 48, as are also the pitmen 55 and 56. To operate the arm 49 I provide at one side of the steering post 19 an upright shaft 60 which is suitably mounted in a standard 61 attached to the floor of the vehicle. Said shaft extends through and below the floor into the plane of the arm 49, and a radius arm 62 fixed to the bottom end of said shaft and extending substantially parallel to the arm 49 has its rear end connected to the rear end of said arm by a link 63. A lever arm 64 is attached to the top of the shaft 60 and is adapted for coaction with a notched segment 65 on a plate 66 attached to the bottom wall 18$^a$ of the dash 18. The notches in the segment are arranged to correspond with the different positions of the lever arm 64 corresponding to the positions of the arm 49 for the several speeds including the reverse and the neutral points intermediate said speeds. The segment bears numbers or other indicia to denote the several speeds at the different points as clearly indicated in Figure 5.

The gear shift is connected with the throttle valve in the following manner:—67 indicates the operating rod for the throttle, said rod being capable in the examples illustrated, of a longitudinal reciprocable movement,—to the left as shown in Figure 1, to close the throttle, and to the right to open the throttle. A foot pedal lever 68 is pivotally mounted on a bracket 69 attached to the floor of the vehicle, and has its bottom end connected by a link 70 to the throttle rod 67. The foot pedal 68 is capable of a rocking movement forward and back, readily brought about by raising and lowering the heel,—the first movement operating to push the rod 67 forwardly to close the throttle, and the second movement operating to pull the rod 67 rearwardly to open the throttle. In this way a positive control of the throttle valve is provided both in the opening and in the closing of the throttle, and springs for this control are obviated.

In addition to the foregoing positive control of the throttle valve, I also provide means for connecting the throttle valve with the gear shift, so that said valve is actuated automatically during the shifting of the gears. Said means are as follows:—On the bottom of the gear shift control shaft 60, is fixed a segment 71. Said segment has an arcuate rim 72 on which are arranged a plurality of arcuate inwardly facing shoulders 73, said shoulders each corresponding with a neutral position of the gear shift. Midway between said shoulders, and spaced radially outward therefrom, are a plurality of shoulders 74, through which extend adjusting screws 75, and a flat spring band 76 is arranged about the outer faces of the shoulders 73 and against the inner ends of the adjusting screw 75 as clearly shown in Figure 2. By adjustment of the screws 75, the part of the spring band intermediate the inwardly facing shoulder 73 may be approached nearer to the center of the segment than the shoulders themselves, the amount being determined by the adjustment of said screws. In line with the throttle rod 67 is a short supplemental rod 78, carrying at its rear end a finger 79, adapted to engage through the medium of an anti-friction roller 80 with the inwardly facing shoulders 73, and with the parts of the spring band 76 exposed in between said shoulders. The supplemental rod is connected by a spring 81 to the main throttle rod 67. These parts are so adjusted and arranged that when the roller 80 is engaged with one of the inwardly facing shoulders 73, the throttle rod 67 will be pushed forward to its limit so as to close the throttle valve. When the roller engages a part of the spring band intermediate the inwardly facing shoulders 73, which points correspond to the position of the shift mechanism when the driven shaft is in one or other of the several speeds or reverse, the throttle will be held open a certain amount, as, for example, to drive a car at ten, fifteen, or twenty miles an hour, or even more, depending upon the adjustment of the screws 75. By this arrangement, when the gear shift is passing from one speed through the neutral point to another speed, the throttle will be automatically closed during the time that the shift passes through the neutral point, and will be automatically opened, gradually, to operate the motor at the predetermined speed when one or the other of the speeds is brought into play, but in each case of shift of the gear from one speed to the other, the throttle will be closed at each neutral point, which permits the shifting of the gears without actuating the vehicle clutch.

By reason of the spring 81, it will be manifest that the foot pedal 68 may be operated independently of the segment 71. The car, however, may be driven with the throttle controlled entirely by said segment, in which case it is not necessary to use the foot pedal 68 at all unless in emergency, as where the speed at which the segment 71 is adjusted, is found to be for the moment too high, as in passing a vehicle, or when slowing up for any other reason, without shifting the gears.

Many advantages of the invention will be apparent to those familiar with the art. While in describing my invention I have referred to certain details of the mechanical construction and arrangement of parts, it is to be understood that the invention is to be in no way limited thereto except as pointed out in the appended claims.

I claim as my invention:—

1. A gear shift mechanism, comprising in combination with a driving shaft, a driven shaft, a counter shaft, and a plurality of gears adapted to connect said shafts to operate the driven shaft at first and second speeds and in reverse, a clutch and operating yoke intermediate the gears of the first ratio and the reverse gear, a second clutch and operating yoke intermediate the gears of the second ratio and the driving shaft, a main gear shift arm, rotative members, one for each operating yoke at opposite sides of said arm, adapted to be oscillated in opposite directions thereby, and means connecting said rotative member to its associated operating yoke.

2. A gear shift mechanism, comprising in combination with a driving shaft, a driven shaft, a counter shaft, and a plurality of gears adapted to connect said shafts to operate the driven shaft at first and second speeds and in reverse, a clutch and operating yoke intermediate the gears of the first ratio and the reverse gear, a second clutch and operating yoke intermediate the gears of the second ratio and the driving shaft, a main gear shift arm, rotative members, one for each operating yoke at opposite sides of said arm, adapted to be oscillated in opposite directions thereby, and means connecting said rotative member to its associated operating yoke, including a device permitting said yoke to yield.

3. A gear shift mechanism comprising a driving, a driven, and a counter shaft, a plurality of gears connecting said shafts to operate the driven shaft at first and second speeds and in reverse, a clutch and operating yoke intermediate the gears of the first ratio and reverse, and a second clutch and an operating yoke between the gears of said ratio and the driving shaft, yielding means for locking said yokes in neutral position, a main gear shift arm, rotative members, one for each operating yoke, on opposite sides of said arm, adapted to be oscillated in opposite directions thereby, and means connecting each rotative member to its associated operating yoke.

4. A gear shift mechanism comprising a driving, a driven, and a counter shaft, a plurality of gears connecting said shafts to operate the driven shaft at first and second speeds and in reverse, a clutch and operating yoke intermediate the gears of the first ratio and reverse, and a second clutch and an operating yoke between gears of said ratio and the driving shaft, yielding means for locking said yokes in neutral position, a main gear shift arm, rotative members, one for each operating yoke, on opposite sides of said arm, adapted to be oscillated in opposite directions thereby, and means including a yielding member connecting each rotative member to its associated operating yoke.

5. A gear shift mechanism comprising a driving, a driven, and a counter shaft, a plurality of gears connecting said shafts to operate the driven shaft at first and second speeds and in reverse, a clutch and an operating yoke intermediate the gears of the first ratio and the reverse gear, and a second clutch and an operating yoke between the gears of the second ratio and the driving shaft, longitudinally reciprocable rods on which said yokes are mounted, a main gear shift arm, rotative members, one for each rod on opposite sides of said arm, adapted to be oscillated in opposite directions thereby, and pitmen operatively connecting the rotative members with said reciprocable rods.

6. A gear shift mechanism comprising, a driving, a driven, and a counter shaft, a plurality of gears connecting said shafts to operate the driven shaft at first and second speeds, and in reverse, a clutch and an operating yoke intermediate the gears of the first ratio and the reverse gear, a second clutch and an operating yoke intermediate the gears of the second ratio on the driving shaft, longitudinally reciprocable rods, each having a yielding connection with one of said operating yokes, means for yieldingly locking said rods in position corresponding to the neutral positions of said yokes, a main gear shift arm, oscillatable rotative members, one for each rod, on opposite sides of said arm adapted to be oscillated through a three-quarter turn in opposite directions thereby, and pitmen connecting said rotating members and said reciprocable rods.

7. A gear shift mechanism comprising a driving, a driven, and a counter shaft, a plurality of gears connecting said shafts to operate the driven shaft at first and second speeds and in reverse, a clutch and an operating yoke intermediate the gears of the first ratio and the reverse gear, a second clutch and an operating yoke between the gears of the second ratio and the driving shaft, a main gear shift arm, rotative members, one for each operating yoke, on opposite sides of said arm, and adapted to be oscillated in opposite directions thereby, means connecting each rotative member to its associated operating yoke, an upright shaft, means connecting said upright shaft with said main gear shift arm, and a hand lever for rocking said shaft.

8. A gear shift mechanism comprising a driving, a driven, and a counter shaft, a plurality of gears connecting said shafts to operate the driven shaft at first and second speeds and in reverse, a clutch and an operating yoke intermediate the gears of the first ratio and the reverse gear, a second clutch and an operating yoke between the gears of the second ratio and the driving shaft, a main gear shift arm, rotative members, one for each operating yoke, on opposite sides of said arm, and adapted to be oscillated in opposite directions thereby, means connecting each rotative member to its associated operating yoke, an upright shaft, means connecting said upright shaft with said main gear shift arm, a hand lever for rocking said shaft, and a notched segment associated with said lever arm and bearing indicia corresponding to the several speeds and the neutral points of said gear shift mechanism.

9. In a gear shift mechanism, in combination with a drive shaft, a driven shaft, a counter-shaft and gears connecting said shafts, said gears including a gear fixed on the drive shaft, an intermeshing gear loose on the counter-shaft, and a secondary speed gear loose on the driven shaft, a clutch normally connecting the said intermeshing gear to the counter-shaft, a second clutch movable on the driven shaft intermediate the gear on the drive shaft and the secondary speed gear on the driven shaft for connecting either to the driven shaft, and means for disengaging the clutch on the countershaft from the said intermeshing gear actuated in the movement of the said second clutch to directly connect the drive and driven shafts, said means being inoperative when the said second clutch is moved to connect said secondary speed gear with said driven shaft.

10. In a gear shift mechanism, in combination with a drive shaft, a driven shaft, a counter-shaft and gears connecting said shafts, said gears including a gear fixed on the drive shaft, an intermeshing gear loose on the counter-shaft, and a secondary speed gear loose on the driven shaft, a spring-controlled clutch normally connecting the said intermeshing gear to the countershaft, a second clutch movable on the driven shaft intermediate the gear on the drive shaft and the secondary speed gear on the driven shaft for connecting either to the driven shaft, and a duplex clutch shift member pivoted intermediate the counter-shaft and the driven shaft adapted to disengage the said spring controlled clutch from its associated gear actuated in the movement of the said second clutch to directly connect the drive and driven shafts, said duplex clutch shift member being inoperative when the said second clutch is moved to connect said secondary speed gear with said driven shaft.

11. In a gear shift mechanism, in combination with a drive shaft, a driven shaft, a counter-shaft and gears connecting said shafts, said gears including a gear fixed on the drive shaft, an intermeshing gear loose on the counter-shaft, and a secondary speed gear loose on the driven shaft, a spring-controlled clutch normally connecting the said intermeshing gear to the counter-shaft, a second clutch movable on the driven shaft intermediate the gear on the drive shaft and the secondary speed gear on the driven shaft for connecting either to the driven shaft, an operating yoke member for actuating said second clutch, and a duplex yoke member pivoted intermediate the counter-shaft and the driven shaft, adapted to be actuated by the operating yoke member to disengage the said spring-controlled clutch from its associated gear, said two yoke members being correlated so that the duplex yoke member is inoperative when the operating yoke member moves the said second clutch to connect the secondary speed gear with said driven shaft.

In testimony that I claim the foregoing as my invention, I affix my signature in the presence of two witnesses, this 6th day of November, A. D. 1920.

EDWIN B. WILES.

Witnesses:
T. H. ALFREDS,
CHRISTINE DEANS.